United States Patent
Ponzio et al.

(10) Patent No.: US 11,616,426 B2
(45) Date of Patent: Mar. 28, 2023

(54) METHOD FOR MANUFACTURING A STATOR

(71) Applicant: ATOP S.p.A., Florence (IT)

(72) Inventors: Massimo Ponzio, Siena (IT); Rubino Corbinelli, Siena (IT); Daniele Nocciolini, Florence (IT)

(73) Assignee: ATOP S.p.A., Barberino Tavarnelle (IT)

( * ) Notice: Subject to any disclaimer, the term of this patent is extended or adjusted under 35 U.S.C. 154(b) by 0 days.

(21) Appl. No.: 17/281,538

(22) PCT Filed: Oct. 9, 2019

(86) PCT No.: PCT/EP2019/077371
§ 371 (c)(1),
(2) Date: Mar. 30, 2021

(87) PCT Pub. No.: WO2020/078799
PCT Pub. Date: Apr. 23, 2020

(65) Prior Publication Data
US 2021/0320573 A1    Oct. 14, 2021

(30) Foreign Application Priority Data
Oct. 19, 2018 (EP) .................... 18201561.0

(51) Int. Cl.
*H02K 15/06*    (2006.01)

(52) U.S. Cl.
CPC ....... *H02K 15/064* (2013.01); *H02K 2213/03* (2013.01); *Y10T 29/49009* (2015.01)

(58) Field of Classification Search
CPC ....... B21F 1/004; B21F 1/008; H02K 15/045; H02K 15/0056; H02K 15/04; H02K 15/0421; H02K 15/064; Y10T 29/53143; Y10T 29/53161; Y10T 29/49822; Y10T 29/49009; B21D 11/10
(Continued)

(56) References Cited

U.S. PATENT DOCUMENTS 2,476,745 A    7/1949    Leece
7,243,414 B2 *    7/2007    Even .................... H02K 15/064
                                                           29/760
(Continued)

FOREIGN PATENT DOCUMENTS

EP         0945952        9/1999
JP         2003-134751    9/2003
(Continued)

*Primary Examiner* — Thiem D Phan
(74) *Attorney, Agent, or Firm* — Haley Guiliano LLP; Jeffrey H. Ingerman (57) ABSTRACT

A method and an apparatus are provided for manufacturing a stator with a plurality of hairpin conductors. For inserting the hairpin conductors (15, 15) into the slots (11) of a stator core (12) a stator core template (22) is provided. Hairpin conductors (15) are axially inserted into slots (21) of the stator core template (22) such that the hairpin conductor (15) is arranged at a first position (P1) within said slot (21). The hairpin conductor (15) is then moved within said slot (21) to a different position (P2). A complete nest (20) of hairpin conductors (15) formed within the stator core template (22) is then transferred to the stator core (12).

19 Claims, 11 Drawing Sheets

(58) Field of Classification Search
USPC ...... 29/596, 598, 592.1, 605, 606, 721, 729,
29/732, 734, 736, 825, 874, 882
See application file for complete search history.

(56) References Cited

U.S. PATENT DOCUMENTS

2018/0023399 A1    8/2018   Okuda et al.
2019/0199184 A1*   6/2019   Oshel ..................... H02K 3/12

FOREIGN PATENT DOCUMENTS

| JP | 2004-072839 | 4/2004 |
| JP | 4004432 | 8/2007 |
| JP | 2013-165510 | 8/2013 |
| WO | WO 2018039806 | 8/2018 |
| WO | WO 2018077812 | 3/2019 |

* cited by examiner

METHOD FOR MANUFACTURING A STATOR

CROSS-REFERENCE TO RELATED APPLICATIONS

This application is a national stage application under 35 U.S.C. § 371 of International Application PCT/EP2019/077371, filed Oct. 9, 2019, which claims the benefit of and priority from European Patent Application No. 18201561.0, filed Oct. 19, 2018, the contents of each of which are hereby incorporated by reference herein in their entirety.

The invention is directed to a method and an apparatus for manufacturing a stator.

It is known to provide stators for electrical motors with a plurality of hairpin conductors which are arranged in slots of a stator core.

The hairpin conductors are typically provided with two legs and a bridge portion joining the two legs. One leg is inserted into one slot. The bridge portion extend axially outward of the stator on one axial side of the stator core whereas the legs extend out of the slots on the opposite axial side of the stator core. By mutually connecting two of the extending legs, a continuous conductor similar to a winding can be created.

One leg of the hairpin conductors is arranged at a smaller radial distance within a first slot and a second leg being arranged at a larger radial distance of a different slot. The bridge of one conductor bridges several slots so that there may be mutually overlapping parts of neighbouring hairpins. Neighbouring hairpins cannot be simply axially inserted into the slots of the stator cores because mutually overlapping parts would collide upon insertion.

In one alternative, hairpin conductors are inserted into the slots in a raw, non-final shape and, once inserted into the slots, are subsequently deformed into the final shape, e.g. by twisting operations. Such an arrangement is e.g. known from EP 945 952 A1. This method requires additional twisting steps and hence is complicated.

Alternatively, it is known to provide completely pre-shaped hairpin conductors which are provided in a shape which corresponds to the final shape in the stator core. Such conductors are pre-assembled into a partial or a full nest outside the stator core and are inserted into the slots of the stator as a preformed nest. No subsequent deformation such as twisting of the conductors within the stator is required in this case.

JP 4004432-B2 discloses a device for pre-assembling a nest of hairpins each having two legs and a bridge connecting the legs. The legs are arranged along a circumference with two legs of different conductors being arranged in the same slot, thereby forming a first layer of hairpin conductors. For forming the nest, a first leg is inserted into a slot of a receiving body whereas a second leg is inserted into a spiral guide track. By indexing the receiving body with the slots and by adding subsequent hairpins, a one layered nest can be pre-formed. However, with such an arrangement, it is not possible to build a multilayer arrangement or to use various hairpin conductors of different types.

A similar arrangement is shown in JP2013-165540 A. According to this arrangement, a different type of a spirally wound guiding path is shown.

WO2018/0077812 or JP2003-134751 A disclose an arrangement where hairpin conductors are mounted in a support rotatably around one leg and under an angle relatively close to a radius. The conductors are subsequently pivoted around the rotatable mounting such as to become arranged at an angle closer to a tangent. With such an embodiment, resembling a petal of a flower, it is only possible to arrange one layer of hairpin conductors. Furthermore, also with this method, the use of conductors of different types within the same stator is not easily possible.

According to US2018/0233995 A1 or to WO2018/039806 A2 sub-groups of hairpin conductor nests are pre-assembled separately, then merged together and inserted into a stator. Such a procedure requires additional merging steps and therefore is complicated and time consuming.

It is therefore an object of the present invention, to overcome the disadvantages of the prior art and in particular to provide an apparatus and a method for manufacturing a stator with a plurality of hairpin conductors which allows an easy insertion of the hairpin conductors into the slots of the stator core, which allows flexibility in view of the number of layers to be formed and/or in view of the types of conductors used and which is fast and reliable.

According to the present invention, these and other objects are solved with a method and an apparatus according to the independent patent claims.

The method for manufacturing a stator core according to the present invention is used for manufacturing a stator with a plurality of hairpin conductors arranged in slots of a stator core.

In a first step a stator core template is provided. The stator core template is designed similar to the stator core and in particular comprises a number of radially and axially extending slots corresponding to the number of slots of the stator core. The slots of the stator core template have a circumferential width which is larger than the circumferential width of the slots of the stator core and/or they have a radial length which is larger than the radial length of the slots of the stator core. As will be explained hereinafter, this larger size of the slots of the stator core template allows a movement of inserted hairpin conductors between different positions within the slots of the stator core template. While the number of slots of the stator core template corresponds to the number of slots of the stator core and the circumferential and radial dimensions of the slots of the stator core template are larger than those of the stator core, the axial length of the stator core template may be substantially smaller than the axial length of the stator core.

In a second step, at least one hairpin conductor is inserted into at least one of the slots of the stator core template. In case of a conductor having two legs, each leg is inserted into a different slot. The insertion is made such that the hairpin conductor is arranged at a first position within said slot(s). In this first position the hairpin conductor is arranged in a different position than in a second position close to or corresponding to the intended final position in the stator core.

Thereafter, the hairpin conductor is moved within the slot(s) of the stator core template from the first position to the second position. The direction of movement is at an angle with respect to the insertion direction and typically perpendicular to the insertion direction. By such a two-step movement (first inserting to a first position and then moving the hairpin conductors to a second position) the problem of collision between subsequently inserted conductors due to overlapping bridges can be avoided.

The steps of inserting and moving a hairpin conductor is repeated for at least one additional hairpin conductor so as to form a first layer of a partial nest or of a complete nest of hairpin conductors. These steps are repeated until a desired semifinal or final partial nest or nest has been built.

The partial nest or the nest of hairpin conductors is then removed from the stator core template and inserted into the slots of the stator core. Typically, removal and insertion is made in the axial direction. However, it might also be possible to provide a split stator core template which can be opened such as to laterally remove the partial or the complete nest of conductors.

Because of the larger size of the slots of the stator core template, there is no risk of jamming during the movement of the conductors within the stator core template. In particular, different circumferential distances between stators at different radiuses can be taken into account by a larger circumferential size. A larger radial size of the slots of the stator core template allows a radial movement of the inserted conductors between the first and the second position.

According to a preferred embodiment, the inserted hairpin conductors hence are radially moved within the slot(s) of the stator core template such that they will be arranged at a second position radially different from the first position. Preferably, the second position is radially inwardly of the first position. Such a movement can be achieved more easily by means of automatic devices. However, a radially outwardly directed movement to a second position would also be possible.

Preferably, the steps of inserting and moving several subsequently inserted hairpin conductors in order to form a first layer may be repeated such as to form a further layer of a partial nest or a complete nest. Since the radial length of the stator core template can be freely chosen, it is possible to provide as many layers of hairpin conductors as desired.

Preferably, the first layer and the further layer or further layers are axially removed jointly from the stator core template as a complete nest and axially inserted jointly as a complete nest into the stator core. It is, however, also possible to form partial nest and to merge the partial nests outside the stator core template prior to insertion into the stator core.

At least some of the inserted hairpin conductors are completely preformed and in particular comprise a pair of leg portions which are joined together by a bridge portion. Such preformed hairpin conductors are known as such. A first leg portion is arranged in the stator core template in a first slot at a first radial distance. A second leg portion is arranged in the stator core template in a second slot different from the first slot at a second radial distance which is larger than the first radial distance. The first and the second slot typically may be separated from each other in the circumferential direction by additional slots. However, the first and second slot also might be directly neighbouring slots.

According to the method of the invention, the second leg portion of at least some hairpin conductors may be arranged in a slot of the stator core template such as to be adjacent to a first leg portion of a hairpin conductor which has been previously inserted into this slot. In the final stator core, neighbouring leg portions will be tightly packed. When inserted into the stator core template such neighbouring leg portions are also adjacent, but may be loosely arranged.

For building a complete layer of a nest of hairpin conductors, preferably, the second leg portions of an initial group of hairpin conductors is arranged in slots of the stator core template neighbouring a spacer element. No previously arranged hairpin conductors are present in these slots when the conductors of the initial group are inserted. Therefore, for the second legs of this initial group (which are supposed to be arranged at a larger radial distance) there are no first legs of previously inserted conductors in the same slot adjacent to which the conductors of the initial group may be inserted. Instead of such first legs, a spacer element may be provided which allows to keep the second leg portions at a predefined radial distance or to move the second leg portion to a predefined radial distance. This predefined radial distance typically is equal to or larger than the second radial distance at which the second legs are supposed to be finally arranged in the stator core template. By keeping or moving the second leg portion at/to a predefined radial distance, a radial gap is maintained or created within the respective slots of the stator core template neighbouring the second legs.

Subsequently, first leg portions of further hairpin conductors are inserted into the gap within the respective slots adjacent to the second leg portion. In order to clear the gap, the spacer is typically removed. Depending on the specific embodiment of a spacer used, such a removal may not be absolutely necessary in case the spacer does not obstruct the gap.

In order to create a continuous, homogenous layer of hairpin conductors of the same type, the hairpins of a subsequent group will typically be inserted once the hairpins of the first group have been inserted. Thereby, in one slot, a second leg of the hairpin conductors of this subsequent group is arranged adjacent to a first leg of the hairpin conductors of the initial group or, if the number of hairpins of the subsequent group is exceeding the number of hairpins of the initial group, adjacent to a first leg of a hairpin conductor of the subsequent group.

Finally, the hairpin conductors of final group are inserted into slots of the stator core template with their first legs being arranged into the gap maintained or created by the spacer as described hereinabove.

Typically and preferably, the hairpin conductors of the initial, the subsequent and the final group are inserted into a continuous circumferential sequence. This means that the insertion of the conductors is made continuously in the same circumferential direction (e.g. counter clockwise or clockwise) and that all slots are continuously filled with hairpin conductors without omitting any slot.

In order to form such a homogenous and continuous nest, the initial group typically has a number of conductors which corresponds to the pitch of a hairpin conductor. Pitch is herein referred to as the number of slots which are bridged by one hairpin conductor plus one. The subsequent group typically may have n−2p hairpin conductors where n represents the number of slots. The final group again typically can have p hairpin conductors. It is also possible to build a continuous layer by using hairpin conductors having different pitches.

In an alternative embodiment, a nest or a partial nest which is not continuous or which is not formed of identical hairpin conductors may be formed. In particular, hairpin conductors of different types may be inserted with one leg into a slot. Typically, such conductors of a different type may be i-pin conductors or jumper conductors: i-pin conductors are conductors which have only one leg and which are e.g. used to form connectors. Jumper conductors are used to make a connection between two different layers of hairpin conductors.

Preferably, according to the present method, each hairpin conductor is axially inserted by means of a manipulator and/or each hairpin conductor is then moved and typically radially moved by means of a pusher. While an individual sequence of axially inserting and radially moving each conductor is preferred, it also might be conceivable to axially insert groups of hairpin conductors and to jointly radially move these groups to the final radial position (second position as described hereinabove).

For axially removing and for axially inserting the partial nest or the nest, a head portion of the nest or the partial nest is preferably grasped with a gripper. Such a gripper allows holding and moving the complete nest.

In this context, prior to axially inserting the partial nest or the nest into the stator core, a guide may be inserted between the legs of circumferentially neighbouring hairpin conductors. Typically, such a guide is inserted at a site axially distant from the head portion. The guide may primarily define a predetermined average distance between circumferentially neighbouring legs of conductors. It may also additionally or alternatively define the radial position of the legs of the hairpin conductors. Since the hairpins are initially inserted into the stator core template relatively loosely (seen that the dimensions of the slots of the stator core template are larger than the dimensions of the slots of the stator core), the nest as removed from the stator core template may not necessarily perfectly fit to the size and shape of the stator core. By using a guide, the size and shape of the nest may be adopted to the size and shape of the slots of the stator core.

According to a preferred embodiment, the partial nest or the nest is only partially inserted to an intermediate axial position by means of the gripper. The nest or partial nest then may be inserted into a final axial position in the stator core by means of a separate presser. Typically, the gripper for gripping, moving and inserting the nest needs a certain degree of freedom. It therefore may be more difficult to provide a gripper having sufficient axial pressing force. For this purpose, an additional presser which exclusively creates an axial force (i.e. with little degrees of freedom) and which does not need to grip, move or insert the nest can be used.

According to another aspect of the present invention an apparatus for manufacturing a stator with plurality of hairpin conductors arranged in slots of the core is provided. According to the invention, the apparatus includes a stator core template.

The stator core template has a number of radially and axially extending slots. The number of slots corresponds to the number of slots of the stator core of the stator. The slots of the stator core template have a circumferential width larger than the circumferential width of the slots of the stator core. Alternatively or additionally, a radial length of the slots of the stator core template is larger than the radial length of the slots of the stator core.

The apparatus further comprises an insertion station for inserting at least one hairpin conductor into at least one of the slots of the stator core template. The insertion is typically made axially and in such a way that the hairpin conductor is arranged at a first position within the slot. In the first position the hairpin conductor is arranged differently than in the intended position in the stator core. The apparatus further comprises a moving station for moving the hairpin conductor within said slot of the stator core template from the first position to a second position. The direction of movement is at an angle with respect to the insertion direction and typically perpendicular to the insertion direction. Preferably, the moving station is adapted to move the hairpin conductor such that it will be arranged at a second position radially inside from the first position.

According to a preferred embodiment the slots in the stator core template are spirally formed, seen in a plane perpendicular to the axis of the stator core template. By such a spiral formation, the increase of circumferential distances between respective slots due to an increase in diameter/radius may be taken into account and compensated. Jamming in case of radial movement, in particular radial outward movement by means of a radial spacer, may be avoided.

According to still another preferred embodiment the stator core template may be provided with insertion deflectors at an upper axial end between neighbouring slots. The insertion deflectors allow to more easily receive, guide and insert the ends of the legs of conductors to be inserted into the slots of the stator core template.

The apparatus may be further provided with a radial spacer for keeping and/or moving second legs of hairpin conductors inserted into slots of the stator core template at or to a predetermined radial distance.

The apparatus further may be provided with a gripper for gripping a head portion of a nest or a partial nest which is formed in the stator core template. The gripper is used for axially removing the nest or the partial nest from the stator core template and for at least partially inserting said nest or partial nest into the stator core. By using the same gripper for removal and insertion of the nest/partial nest, an efficient operation in one step can be achieved.

The apparatus may be provided with an additional presser for axially inserting the nest or partial nest from an intermediate position to a final position into the stator core.

The apparatus further may be provided with a guiding element which can be inserted between the legs of circumferentially neighbouring hairpin conductors at a site which is axially distant from the head portion.

The invention will be explained hereinafter with reference to the description of specific embodiments and the respective drawings, which show.

Figure 1:
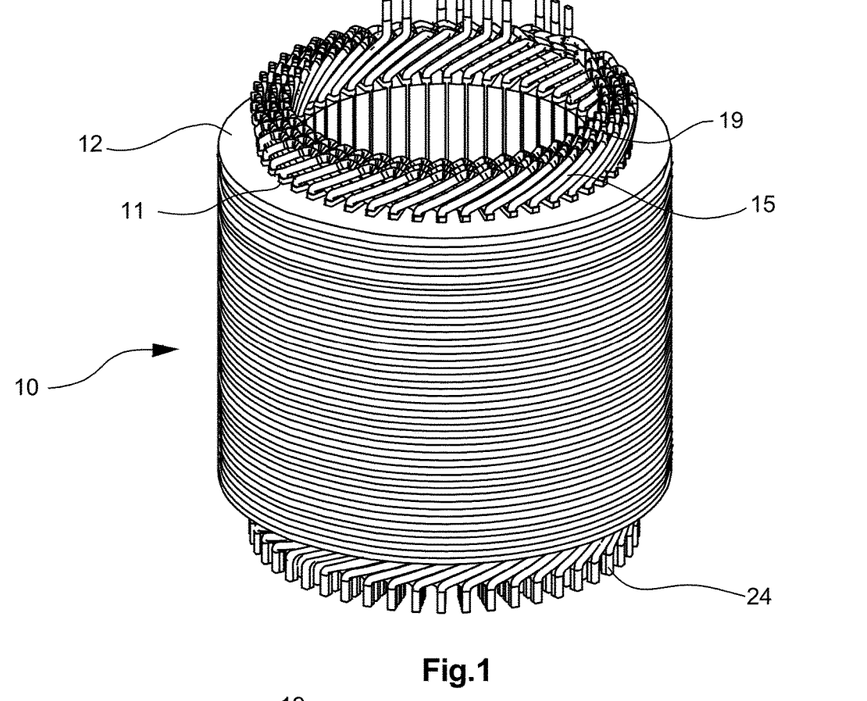
FIG. 1 a perspective view of a stator with inserted hairpins

FIG. 1 shows a perspective view of a stator 10. The stator 10 comprises a stator core 12 which is provided with a plurality of axial slots 11 in a manner known to the skilled person. A number of hairpins 15 are inserted into the slots 11. Bridge portions 19 extend out of the slots 11 at the upper axial side whereas end portions 24 extend out of the slots at an axial lower end of the stator core 11.

Figure 2A:
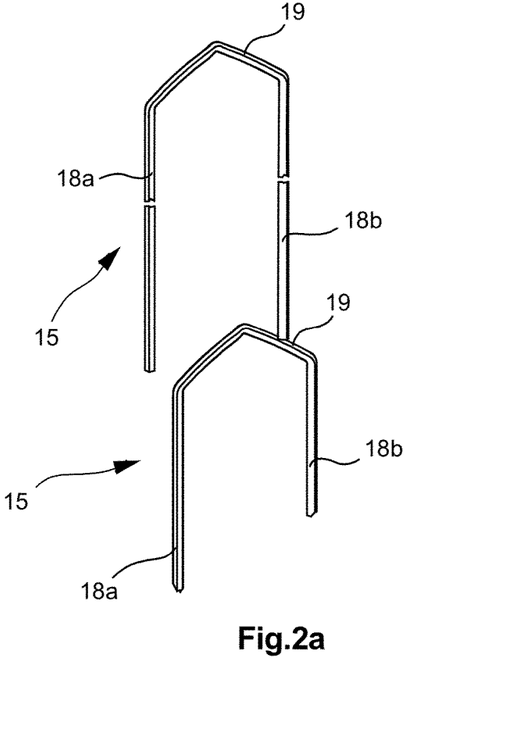
FIGS. 2a and 2b a perspective view of hairpins axially spaced (2a) and in their final position (2b)
Figure 2B:
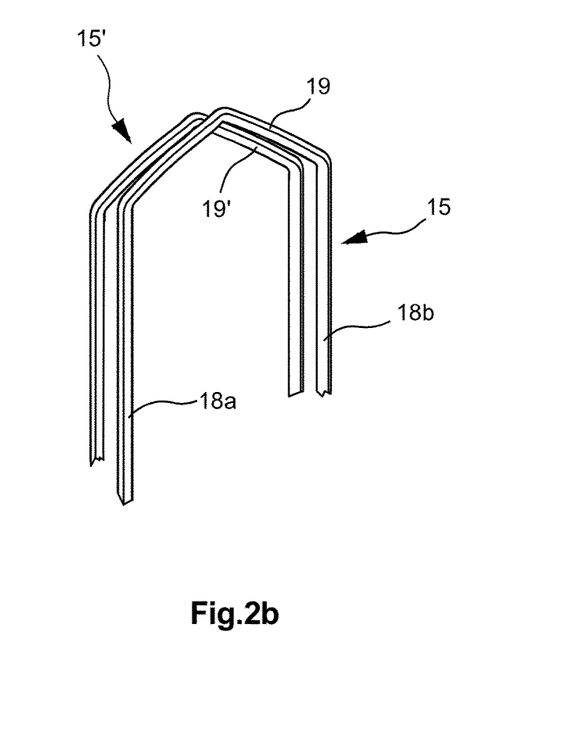
Figure 8:
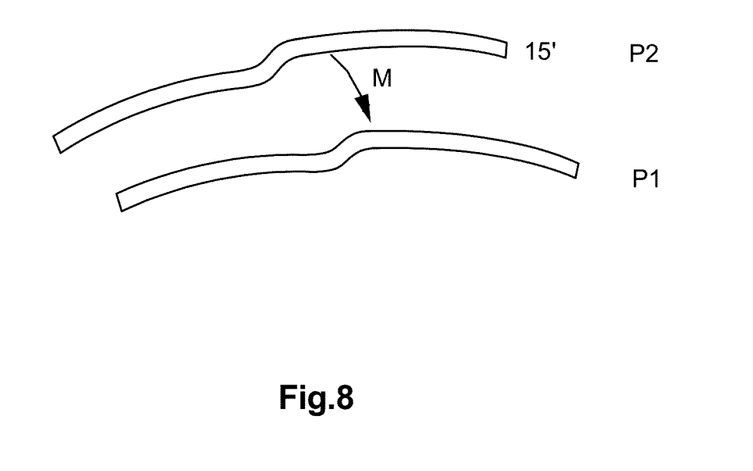

A typical standard hairpin 15 is shown in FIGS. 2a and 2b. The hairpin 15 comprises two legs 18a, 18b which are connected to each other via a bridge portion 19. The legs 18a, 18b run substantially parallel. The bridge portion 19 is bent at an intermediate part. The hairpins 15 have a non-planar shape (see FIG. 8). The hairpins 15 are preformed to their final shape as shown in FIGS. 2a, 2b and 8 by a separate preforming arrangement outside of the stator core template. Such arrangement is known to the skilled person and is not explained in detail.

FIG. 2b shows a first and a second hairpin 15, 15'. On the right hand side of FIG. 2b, the bridge 19 of the hairpin 15 is arranged axially above the bridge 19' of the hairpin 15'. On the left hand side of FIG. 2b, the bridge 19 is arranged axially below the bridge 19' of the hairpin 15'. Due to this overlapping, it is not possible to simply axially insert the two hairpins 15, 15' in a sequence directly into their final position within the stator core 11.

Figure 3:
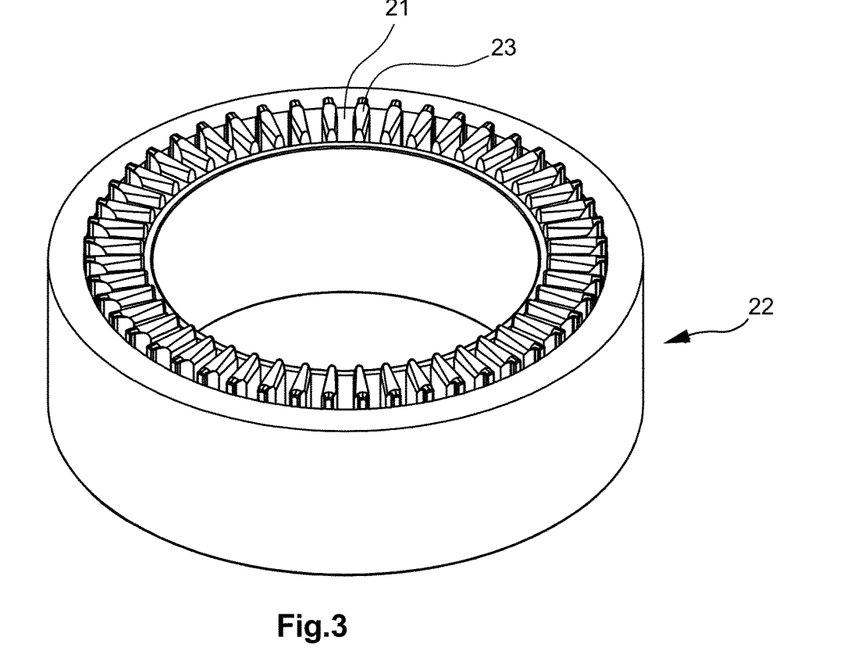
FIG. 3 a perspective view of a stator core template

FIG. 3 shows a perspective view of a stator core template 22 which is used to overcome this problem and in particular to preassemble a nest 20 (see FIG. 12) of hairpin conductors 15 outside of the stator core 12. The stator core template 22 comprises a body which is provided with axial slots 21. The axial slots 21 are evenly distributed along the circumference of the stator core template 22. The number of slots 21 of the stator core template 22 corresponds to the number of slots 11 in the stator core 12. Between neighbouring slots 21 of the stator core template 22 deflectors 23 are arranged at the axial upper end of the stator core template 22. The stator core template 22 can be made of any suitable materials such as metal, but also of suitable plastic material.

Figure 4:
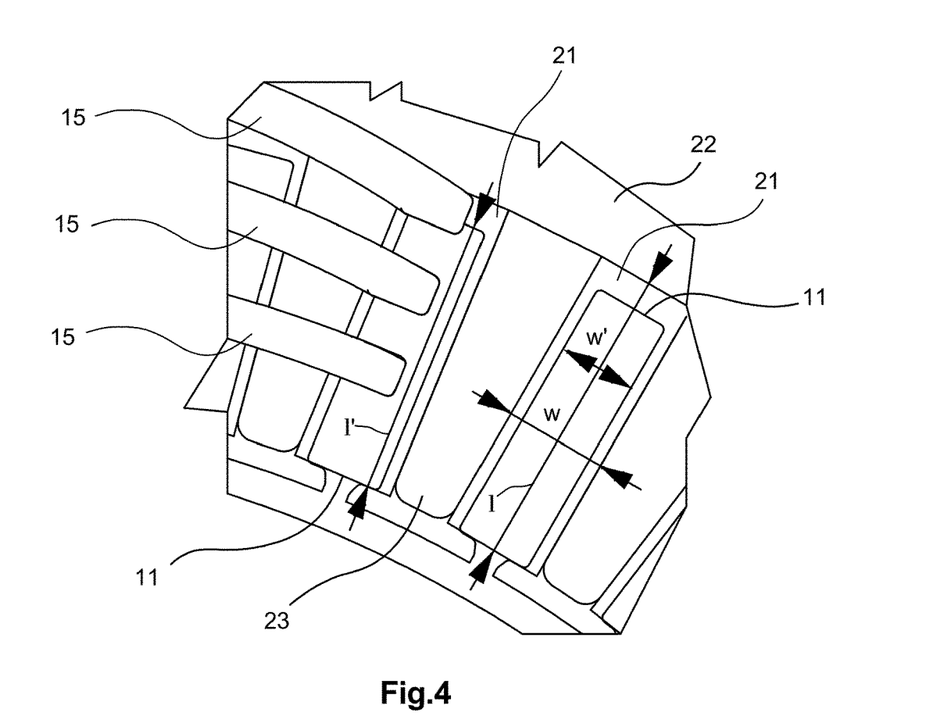
FIG. 4 a top view on slots of the stator core template, overlaid with slots of the stator core FIG. 5 an enlarged perspective side view of an axial end of the stator core template FIG. 6 a perspective view showing the axial insertion of a hairpin conductor into a stator core template FIG. 7 a perspective view showing a radial movement of inserted hairpins in the stator core template FIG. 8 a schematic top view onto hairpins which are radially displaced FIGS. 9a to 9d top views on a stator core template showing the use of a spacer FIGS. 10 and 11 schematic representations of two alternative embodiments of hairpin conductor arrangements FIG. 12 a perspective view of a nest of hairpins held in a stator core template FIG. 13 a perspective view of a stator with a partially inserted nest FIG. 14 a schematic representation of the insertion of a nest into a final position FIG. 15 a side view of an upper part of a gripper unit for gripping a nest FIG. 16 a perspective view of a guiding element in a lower part of the gripping unit and FIG. 17 an enlarged perspective view of the guiding element shown in FIG. 16

FIG. 4 shows an enlarged top view on a section of the stator core template 22. For the purpose of comparison, the shape of a slot 11 of the stator core 12 is overlaid to the drawing in FIG. 4. The slots 21 of the stator core template 22 have a cross-section which is larger than the cross-section of the slots 11. In particular, the circumferential width w and the radial length l of the slots 21 of the stator core template 22 are larger than the width w' and the length l' of the slots 11 of the stator core 12. Because of the relatively large size of the slot 21 as compared to the size of the slot 11 in the stator core 12, the hairpin conductors 15 can be loosely arranged within the slots 21.

Figure 5:
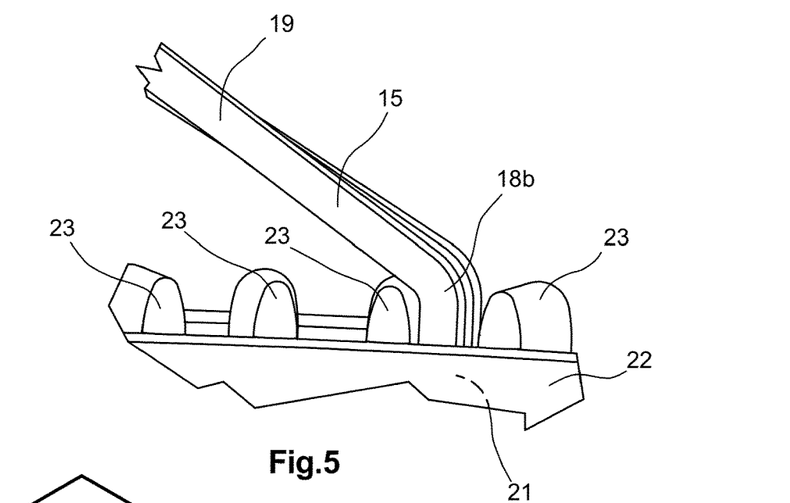

FIG. 5 shows end parts of three hairpin conductors 15 which are inserted into a slot 21 of the stator core template 22. The deflectors 23 are arranged between neighbouring slots 21. The deflectors 23 have a rounded upper edge which facilitates insertion of the ends of the legs 18b of the conductors 15. FIG. 5 schematically shows a plurality of neighbouring hairpin conductors 15 inserted in one slot 21 of the stator core template 22.

Figure 6:
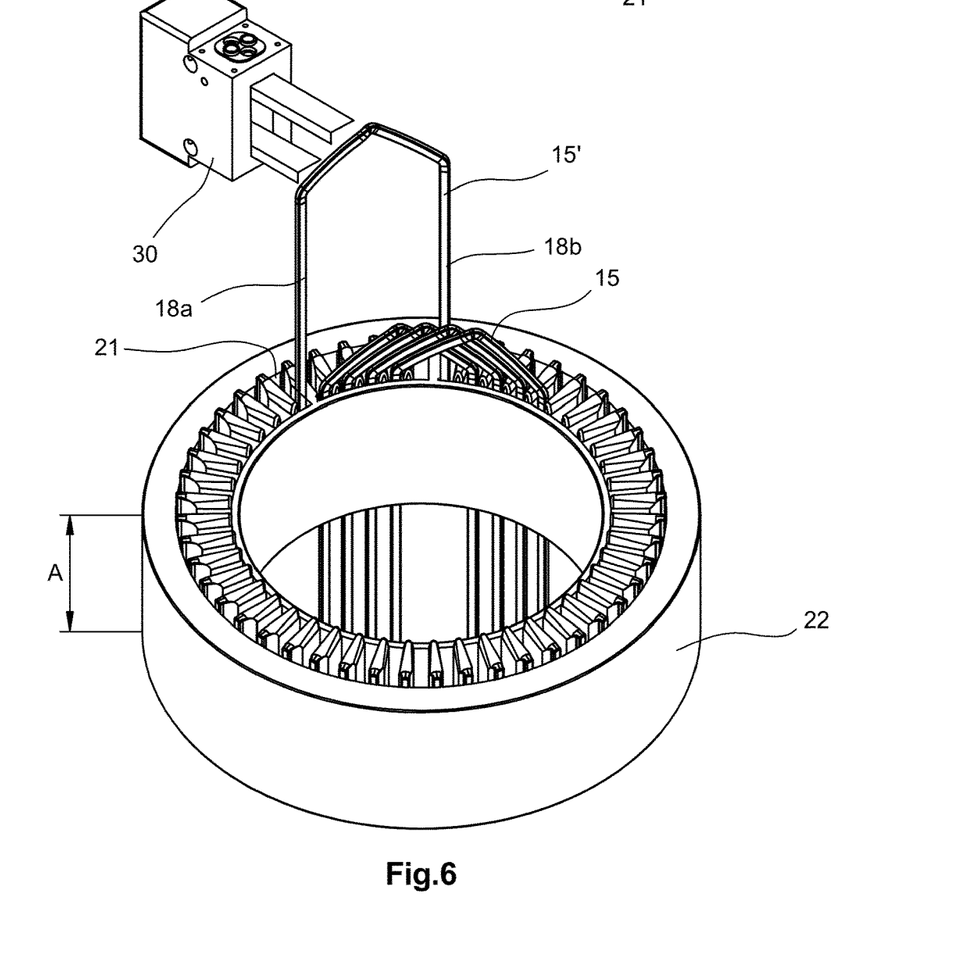

For forming a nest 20 (see also FIG. 12) individual hairpins 15, 15' are inserted into the stator core template 22 in a sequence. FIG. 6 shows stator core template 22 with four previously inserted hairpin conductors 15 and the insertion of an additional hairpin conductor 15'. The hairpin conductor 15' is held by a manipulator 30 which is also schematically shown. By means of the manipulator 30, the hairpin 15' is axially inserted into the stator core template 22 with a first leg 18b being inserted in a first slot and a second leg 18a being inserted into a second slot 21 which is different from the first slot. The axial length A of stator core template 22 is substantially smaller than the axial length of the hair pin conductors, so that the lower ends of the legs of the hairpin conductors 15 substantially extend from the lower axial end of the stator core template 22 and therefore are relatively flexible.

Figure 7:
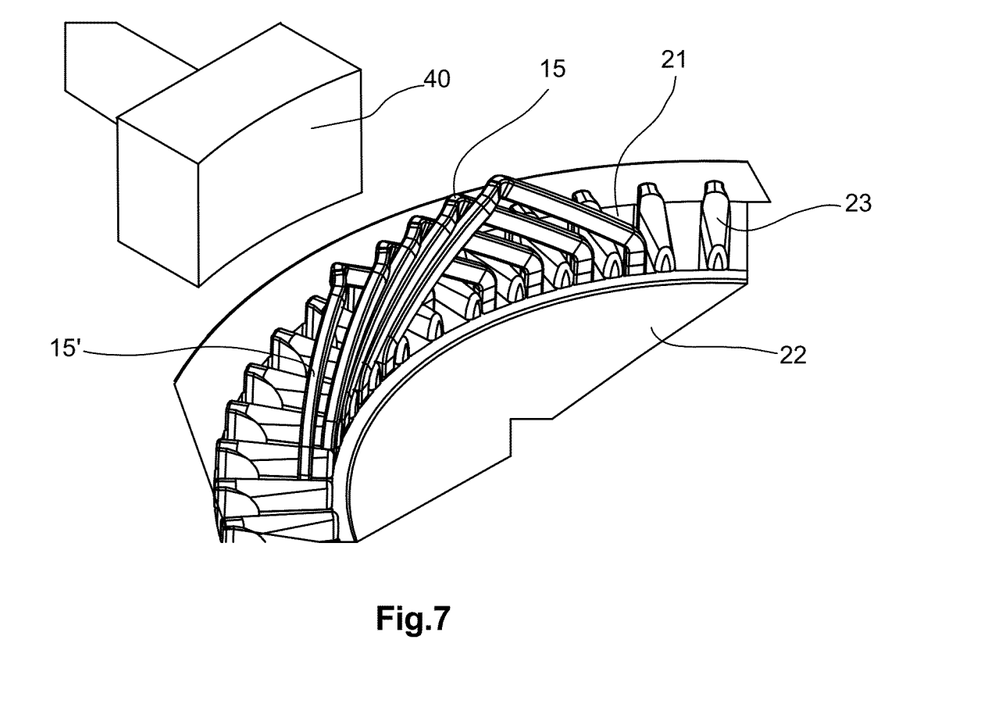

When the hairpin conductor 15' has been axially inserted by the manipulator 30, it is radially moved in a subsequent step by means of a pusher 40 (see FIG. 7). The pusher 40 moves the hairpin 15' from an initial position P2 (see FIG. 8) to a final, radially inwardly arranged position P1. In the position P1 a second leg 18b of the hairpin conductor 15' is adjacent to a first leg 18a of a previously inserted hairpin conductor 15 in the same slot.

This axial and radial placement of hairpin conductors is repeated until the desired arrangement of hairpins has been achieved. In this final arrangement, typically a part or all slots 21 of the stator core template 22 will have received a first and a second leg of two different hairpin conductors. In this way a first layer of hairpin conductors is formed. As can be seen in FIGS. 6 and 7 there is sufficient radial space in the slots of the stator core template allowing insertion of an additional layer of hairpin conductors in the same way as the first layer.

FIGS. 9a to 9d show the formation of one layer of hairpin conductors 15 of the same type which are homogenously arranged along the circumference of the stator core template. The hairpin conductors 15 are sequentially inserted into the slots 21 of a stator core template 22 in the manner as described hereinabove.

Contrary to the stator core template 22 shown in the previous figures, the slots 21 of the stator core template 22 are slightly spirally formed. This allows the radial outward and/or inward movement of the hairpin conductors 15 within the slots 21 of the stator core template 22 without the risk of jamming or deforming the hair pin conductors 15, in particular in case of a radial outward movement by means of a spacer 25 as will described herein below with reference to FIG. 9b.

In this embodiment, insertion of the hairpin conductors 15 is started with a first group G1 of hairpin conductors 15. In the embodiment shown in FIGS. 9a to 9d, the hairpins have a pitch of 6, i.e. the legs of one hairpin are inserted into two separate slots which are separated from each other by five empty slots. The hairpin conductors are inserted into the slots 21 of the stator core template 22 with a first leg 18a at a first radius r1 and with a second leg 18b at a second, larger radius r2 (see also FIG. 10). A first conductor is inserted with its second leg 18b in slot 21'. During insertion of the conductors 15 of the initial group G1 there are no previously inserted hairpin conductors 15 present in the slots. Therefore, the position at radius r1 in those slots where the second legs 18b are inserted at radius r2 is not occupied and therefore the second legs 18b cannot abut against first legs 18a of the previously inserted hairpin conductors 15 in the same slot.

Once the hairpin conductors 15 of the initial group G1 have been brought to their final position by using the pusher 40 as described above, hairpin conductors 15 of a second group G2 are sequentially inserted. Their second legs 18b are arranged at the radius r2 in slots 21 where a first leg 18a of a previously arranged hairpin conductor 15 of group G1 or of group G2 is present. Insertion of hairpin conductors 15 of the second group G2 is sequentially repeated until a first leg 18a of a hairpin is placed into slot 21" (see FIG. 9a).

Figure 9A:
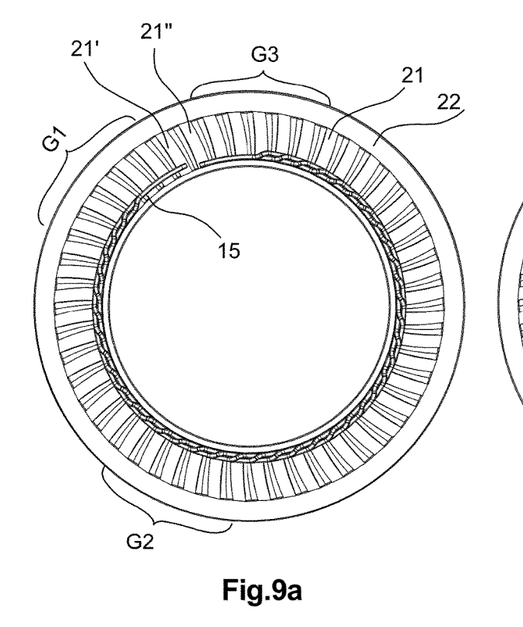

The insertion of hairpin conductors is completed by the insertion of conductors of a final group G3. The first leg 18a of hairpin conductors 15 of the third group G3 has to be placed at a radius r1. This is, however, not easily possible due to the second leg 18b of the previously inserted hairpin conductor 15 of group G1 in slot 21'.

Figure 9B:
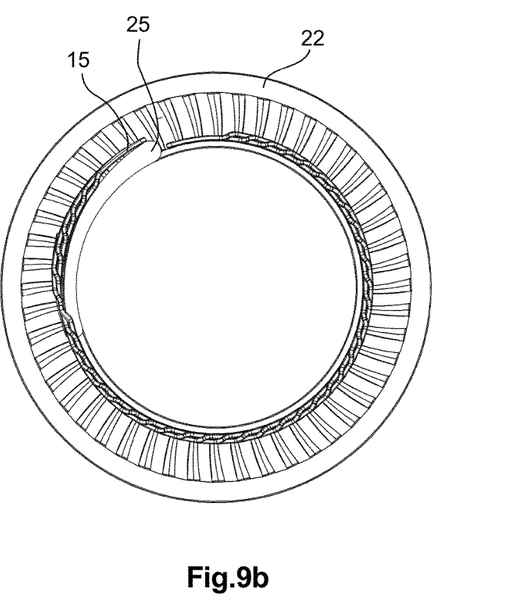
Figures 9C, 9D:
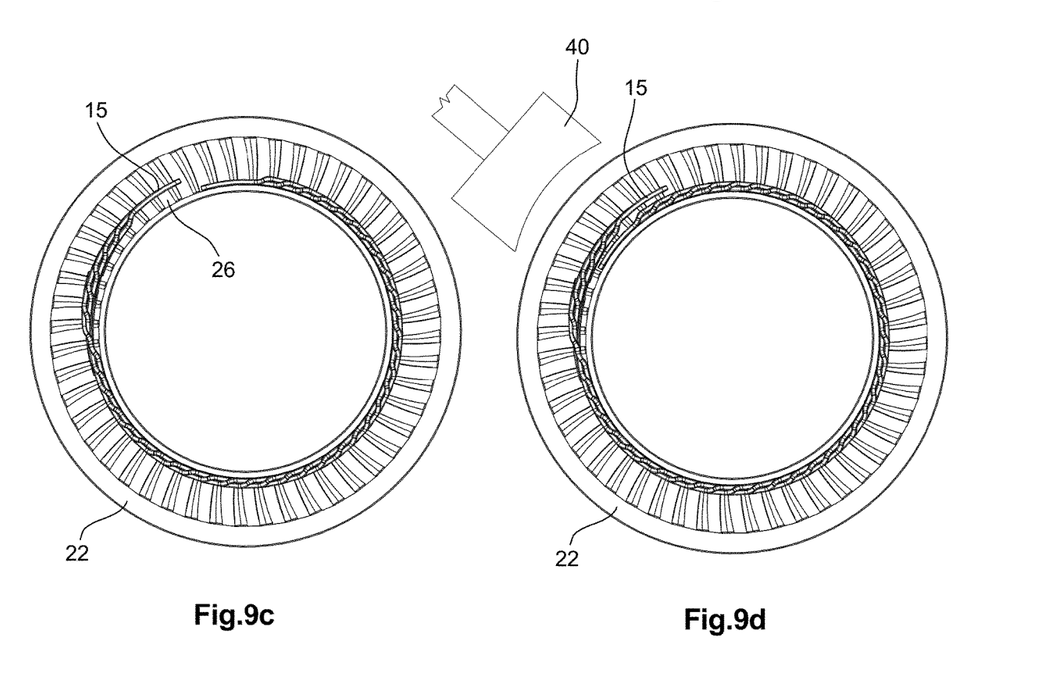

In order to allow insertion of the hairpin conductors of group G3, a spacer 25 is provided (see FIG. 9b). By means of the spacer 25, the hairpin conductors 15 of the first group G1 are moved radially outwardly (see FIG. 9c) such as to create a gap 26 radially inwardly of the second leg 18b of the hairpin conductors 15 of the first group G1. Once the hairpin conductors 15 of the first group G1 are in a radially outward position, the spacer 25 can be removed such as to clear the gap 26. It is now easily possible to insert the hairpin conductors of the third group G3 with their first leg 18a into the gap 26 in the slots 21 in the same manner as described hereinabove with reference to the FIGS. 6, 7 and 8. Once the conductors of the final group G3 have been inserted, the hairpin conductors of the first group G1 (which previously were moved radially outwardly by the spacer 25) can be brought back into their final position, e.g. by means of the radial pusher 40.

While in the embodiment shown in FIGS. 9a to 9d a movable spacer 15 for actively bringing the hairpins of the first group G1 radially outwardly has been shown, it is also conceivable to provide a static spacer which defines a radial abutment for the hairpin conductors of the first group G1, thereby directly creating a gap without the need of actively moving the hairpin conductors 15 of the first group g1 radially outwardly.

Figure 10:
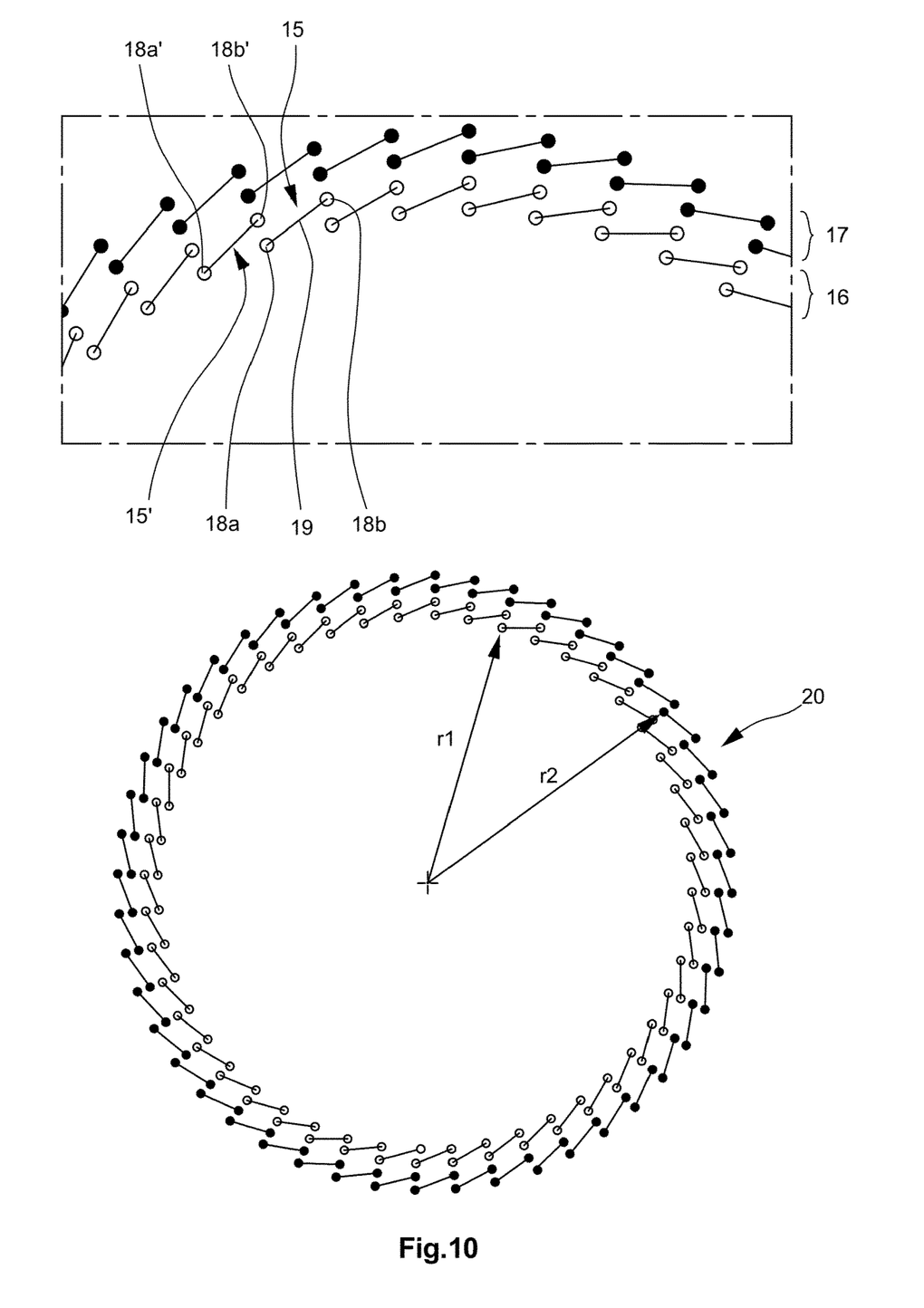
Figure 11:
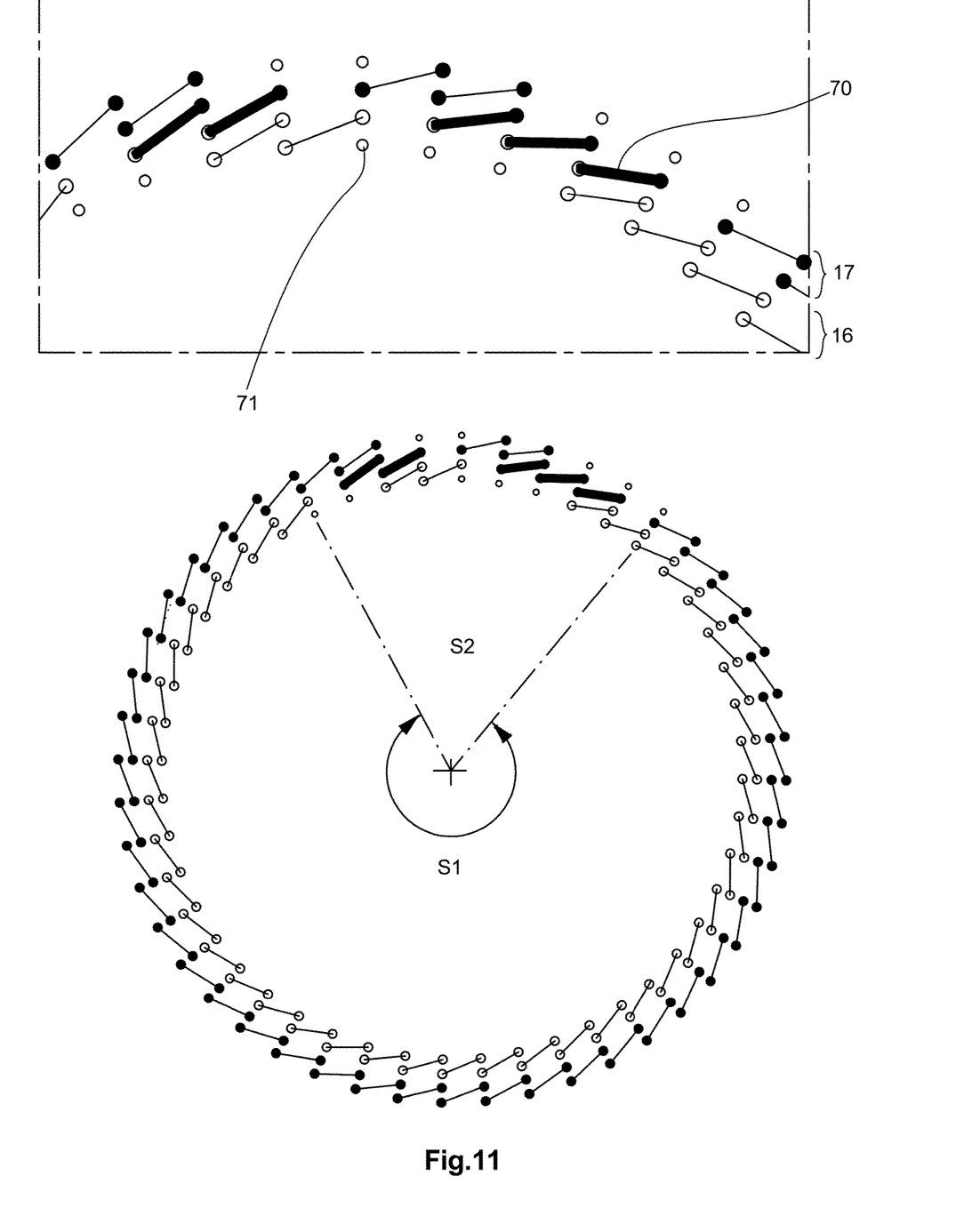

FIGS. 10 and 11 schematically show two types of a final nest of hairpin conductors.

FIG. 10 shows two layers 16, 17 of homogenously and continuously arranged hairpin conductors. In the embodiment shown in FIG. 10, the pitch is 1. Arrangements with larger pitches or arrangements with hairpin conductors having different pitches are also conceivable. The hairpin conductors are arranged in a first, radially inner layer 16 and a second, radially outer layer 17. The layers 16 and 17 together form a complete nest 20.

The top of FIG. 10 shows in more detail that, within a specific slot, a first leg 18a of the hairpin 15 is arranged at a first radial distance r1 whereas a second leg 18b of the same hairpin 15 is arranged at a radial distance r2 in a different slot. The second leg 18b' of a neighbouring hairpin conductor 15' (shown on the left to the first conductor 15 in FIG. 10) is arranged neighbouring the first leg 18a of the first hairpin conductor 15 in the same slot.

FIG. 11 shows an alternative embodiment. Similar to the embodiment in FIG. 10, hairpins of the same type are homogenously arranged over a sector S1 of about 300°. In the remaining sector S2 some hairpin conductors are of different types. Typically, jumpers 70 are used to connect the first layer 16 with the second layer 17. Furthermore, i-pin conductors 71 may be arranged in order to create connection points. Because of the use of different type of hairpin conductors used in FIG. 11, depending on the insertion sequence it may not be necessary to use a spacer 25 similar to the one shown with reference to FIGS. 9a to 9d. I-pin connectors 71 and/or jumpers 70 may be previously inserted and provide abutments to subsequently inserted hairpin conductors.

Figure 12:
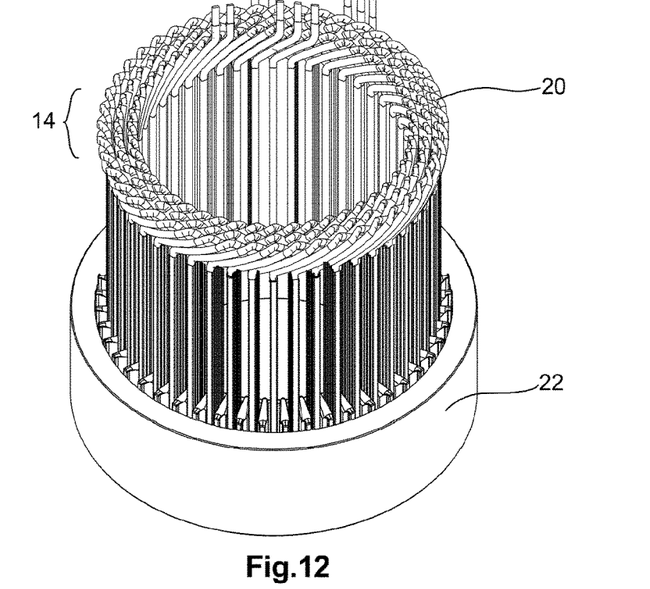

FIG. 12 shows a perspective view of completed nest 20. The nest 20 is still partly contained in the stator core template 22, but has been lifted up axially by using a pusher (not shown) from below. The nest 20 is built by three layers of hairpin conductors, i.e. is similar to the embodiments of FIG. 10 or 11 with one additional layer (not shown in FIG. 10 or 11).

A gripper unit 50 which is circumferentially oriented with respect to the slots 21 of the stator core template 22 is then lowered down towards the nest 20. The complete nest 20 is grasped at an upper end portion 14 by means of the gripper unit 50 (see in more detail FIGS. 15, 16 and 17) and axially removed from the stator core template 22. It is then transferred to and axially inserted into stator core 12 (see FIG. 13).

Figure 13:
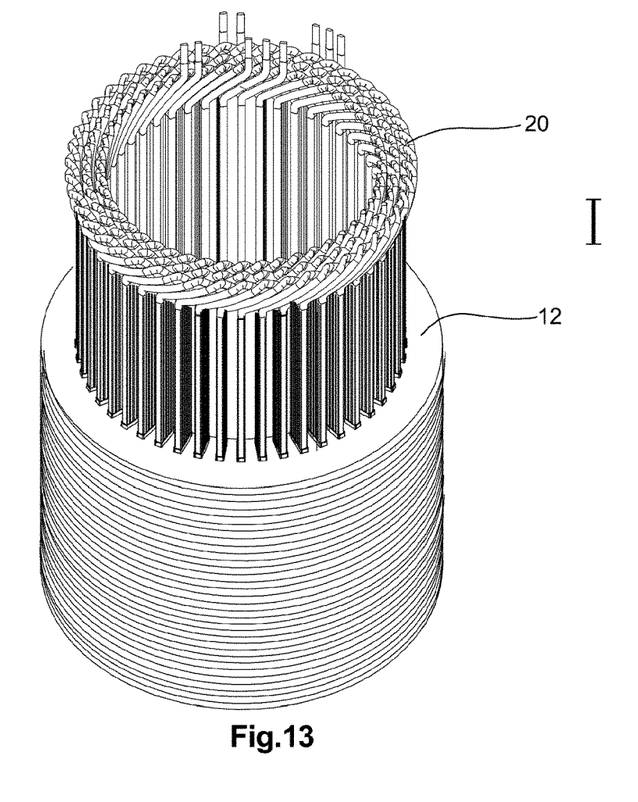
Figure 14:
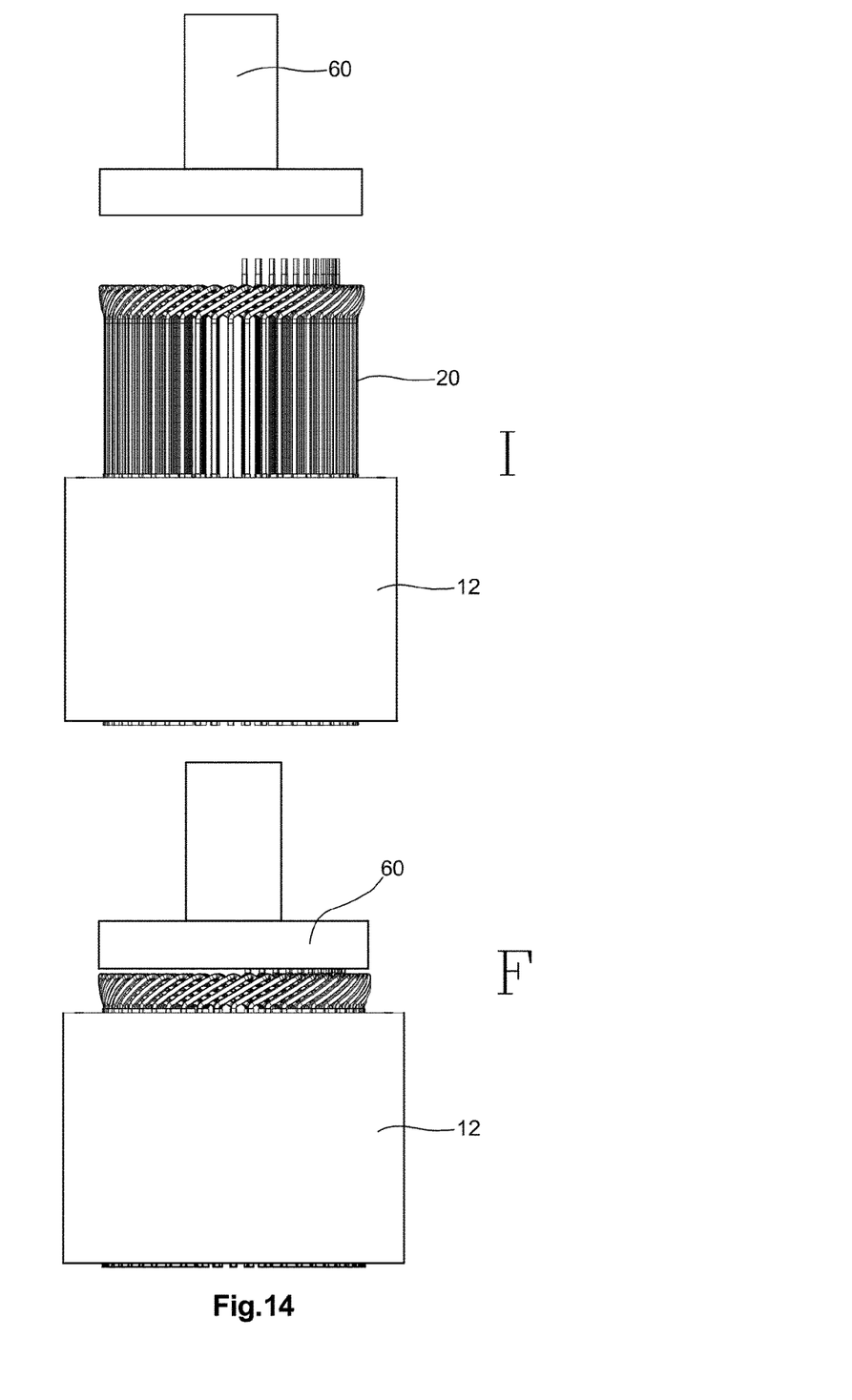

In FIG. 13, the nest 20 is shown in an intermediate position I. In a subsequent step (see FIG. 14) the nest 20 is moved from the intermediate position I to a final position F by means of an axial presser 60. The axial presser 60 is designed in a manner known to the skilled person and typically is driven by an electric motor or pneumatically or hydraulically actuated and controlled by an appropriate control.

Figure 15:
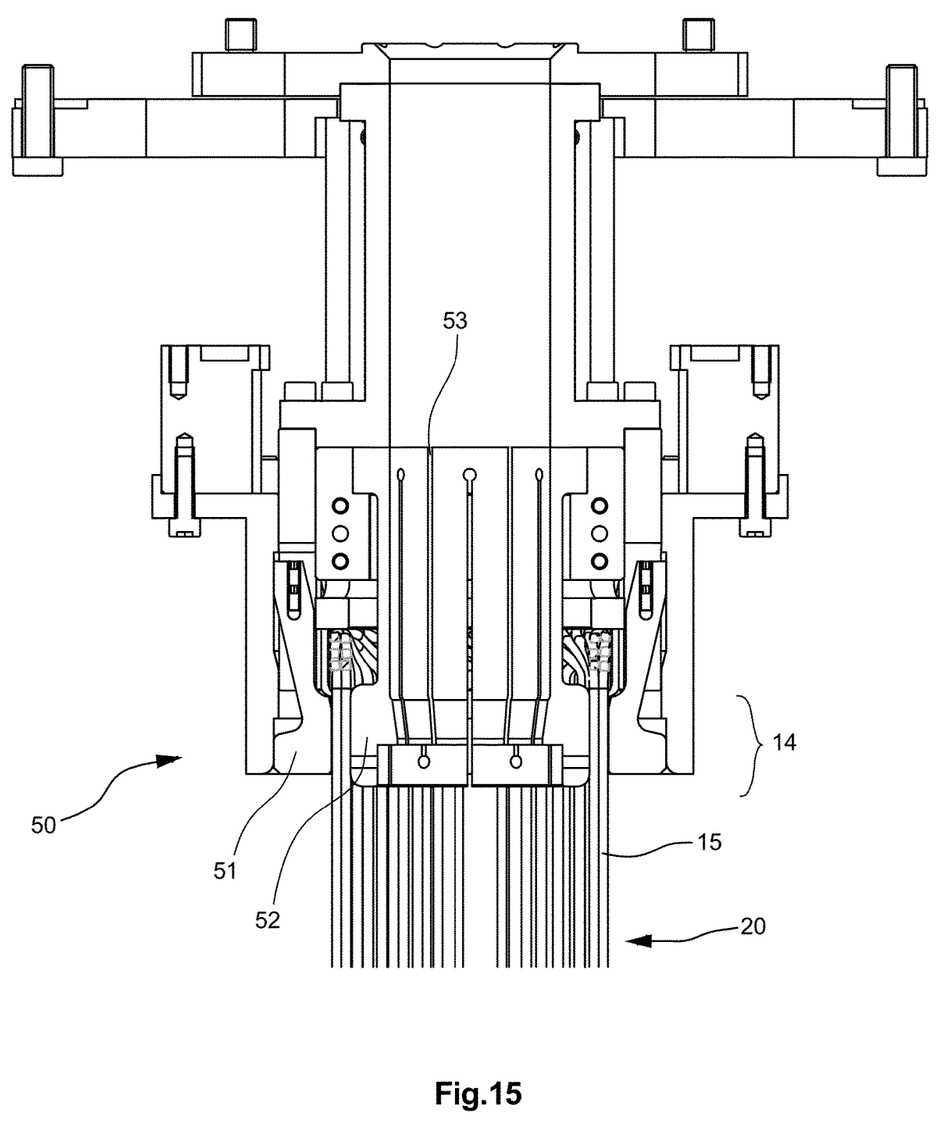

An upper part of the gripper unit 50 is schematically shown in FIG. 15. The upper part of the gripper unit 50 comprises a radially internal abutment member 52 and pivotable clamps 51. The head portion 14 of the nest 20 is gripped between a radially inner surface of the clamps 51 and a radially outer surface of abutment members 52. The abutment members 52 are provided with slots 53 providing flexibility and an adequate clamping force.

For gripping the nest 20, the gripper 50 is axially moved onto the head portion 14 of the partly lifted nest 20 in the stator core template 22 (see FIG. 12) with the clamps 51 in an open position allowing to receive the head portion 14. By pivoting the clamps 51, the head portion 14 is grasped. The nest 20 can be axially removed from the stator core template 22 by lifting the gripper 50. Lifting motion and actuating of the clamps is made in a manner known to the skilled person, typically by an electric motor or pneumatically or hydraulically actuated and controlled by an appropriate control.

Figure 16:
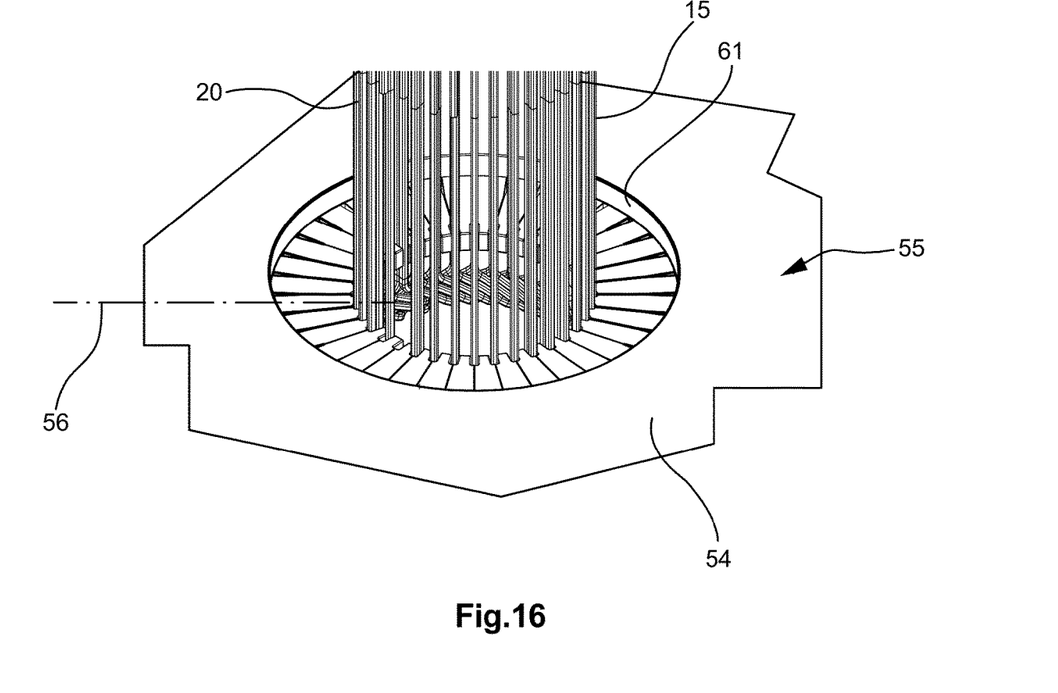
Figure 17:
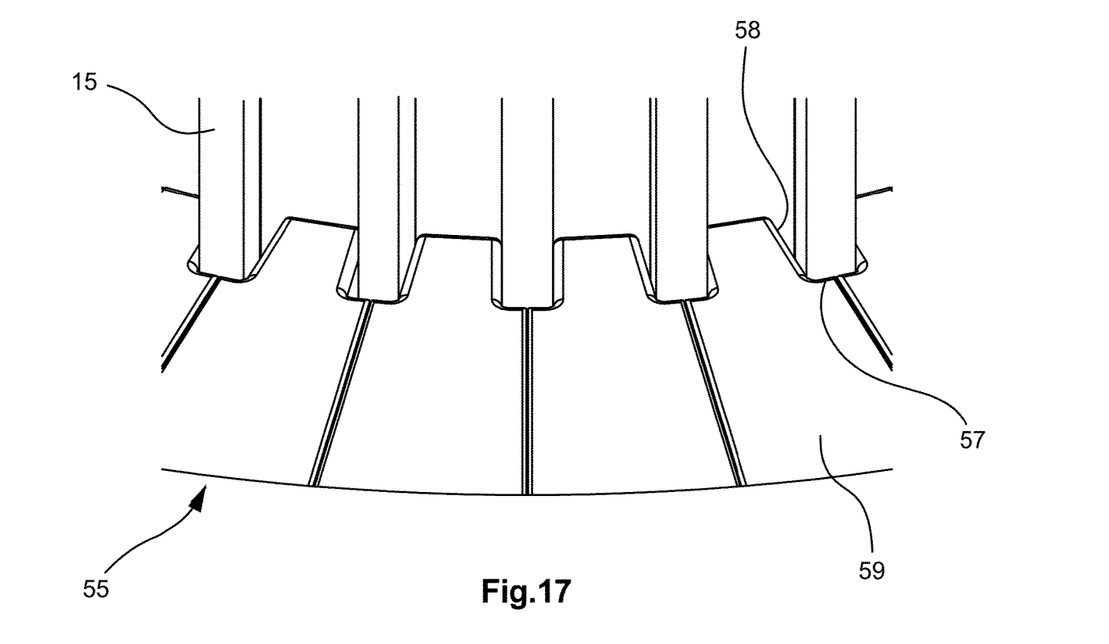

In a lower part the gripper unit 50 is provided with a guiding element 55. The guiding element 55 is applied to the lower end of the hairpin conductors 15 of the nest 20 at a site 56 which is axially spaced from the head portion 14 (see FIG. 16). The guiding element 55 comprises a support 54 with an opening 61 in which a plurality of radially moveable tongues 59 are arranged. The tongues 59 are movable radially between an insertion position (radially outward, not shown) and a guiding position (radially inward, as shown in FIGS. 16 and 17). When the gripper unit 50 is lowered onto the nest 20 as described above, the tongues 59 are in their radial outward position, allowing the legs of the hairpin conductors to be received within the opening 61 of the support 54. The tongues 59 are then moved radially inwardly so as to become arranged with their tips between neighbouring legs of hairpin conductors. The tongues 59 comprise radial abutment surfaces 57 and circumferential abutment surfaces 58 for guiding the lower ends of the hairpin conductors 15 to a suitable circumferential and radial position allowing insertion into the stator core 12. Once the tongues 59 are radially moved and placed between neighbouring legs, the clamps are actuated as described above and the nest 20 is removed from the stator core template 22.

The invention claimed is:

1. A method for manufacturing a stator with a plurality of hairpin conductors arranged in slots of a stator core, comprising:
   a. providing a stator core template having a number of radially and axially extending slots corresponding to the number of slots of the stator core, said slots of the stator core template having at least one of a circumferential width larger than the circumferential width of the slots of the stator core and a radial length larger than the radial length of the slots of the stator core;

b. inserting at least one hairpin conductor into at least one of said slots of the stator core template such that said hairpin conductor is arranged at a first position within said slot, wherein in said first position the hairpin conductor is arranged differently than in the intended position in the stator core;

c. moving said hairpin conductor within said slot of said a stator core template from said first position to a second position;

d. repeating the inserting and the moving for at least one additional hairpin conductor such as to form a first layer of a partial nest or a nest of hairpin conductors;

e. removing the partial nest or the nest of hairpin conductors from the stator core template before starting to insert the nest or the partial nest into the slots of the stator core; and f. inserting the nest or the partial nest that has been completely removed from the stator core template into the slots of the stator core.

2. The method according to claim 1, wherein in the moving, the hair pin conductor is radially moved within said slot of said stator core template such that it is arranged at a second position radially different from the first position.

3. The method according to claim 2, wherein the second position is inwardly from the first position.

4. The method according to claim 1, wherein the inserting, the moving, and the repeating of the providing and the inserting, are repeated in order to form at least one further layer of the partial nest or the nest of hairpin conductors.

5. The method according to claim 4, wherein the first layer and the at least one further layer are axially removed jointly from the stator core template and axially inserted jointly into the stator core.

6. The method according to claim 1, wherein at least some hairpin conductors are preformed and comprise a pair of leg portions joined together by a bridge portion and wherein a first leg portion is arranged in the stator core template in a first slot at a first radial distance and a second leg portion is arranged in the stator core template in a second slot at a second radial distance larger than the first radial distance.

7. The method according to claim 6, wherein the second leg portion of at least some hairpin conductors is arranged in a slot of said stator core template such as to be adjacent a first leg portion of a hairpin conductor previously inserted into said slot.

8. The method according to claim 6, further comprising:
arranging the second leg portion of an initial group of hairpin conductors in a slot of the stator core template neighboring a spacer element;
by means of said spacer element, keeping the second leg portion at or moving the second leg portion to a predefined radial distance equal to or larger than the second radial distance, thereby maintaining or creating a radial gap within the respective slot of the stator core template; and
inserting a first leg portion of a further hairpin conductor into the gap within the respective slot adjacent to said second leg portion.

9. The method according to claim 8, further comprising removing the spacer element.

10. The method according to claim 8, wherein the hairpin conductors of a subsequent group are inserted into slots of the stator core template and arranged with their second leg adjacent a first leg of another hairpin conductor of the initial group or of the subsequent group, and wherein the hairpin conductors of a final group are inserted into slots of the stator core template with first legs inserted into the gap maintained or created by said spacer.

11. The method according to claim 10, wherein the hairpin conductors of the initial, subsequent and final group are inserted in a continuous circumferential sequence.

12. The method according to claim 8, wherein a leg of at least one hairpin conductor of a different type is inserted.

13. The method according to claim 1, wherein each hairpin conductor is at least one of axially inserted by means of a manipulator and moved by means of a pusher.

14. The method according to claim 1, wherein for axially removing and for axially inserting the partial nest or the nest, a head portion of the partial nest or the nest is grasped with a gripper.

15. The method according to claim 14, wherein, prior to axially inserting the partial nest or the nest, a guide is inserted between the legs of circumferentially neighboring hairpin conductors at a site axially distant from the head portion.

16. The method according to claim 15, wherein the partial nest or the nest is only partially inserted by means of said gripper to an intermediate axial position and wherein the nest or the partial nest is inserted into a final axial position in the stator core by means of a separate presser.

17. The method according to claim 1, wherein providing the stator core template comprises providing the stator core template having a body with a radial inner abutment face.

18. The method according to claim 1, wherein providing the stator core template having a number of radially and axially extending slots comprises providing the stator core template wherein the slots of the stator core template are axially extending holes in a body of the stator core.

19. The method according to claim 1, wherein providing the stator core template comprises providing the stator core template as a single body having a circular shape.

* * * * *